UNITED STATES PATENT OFFICE.

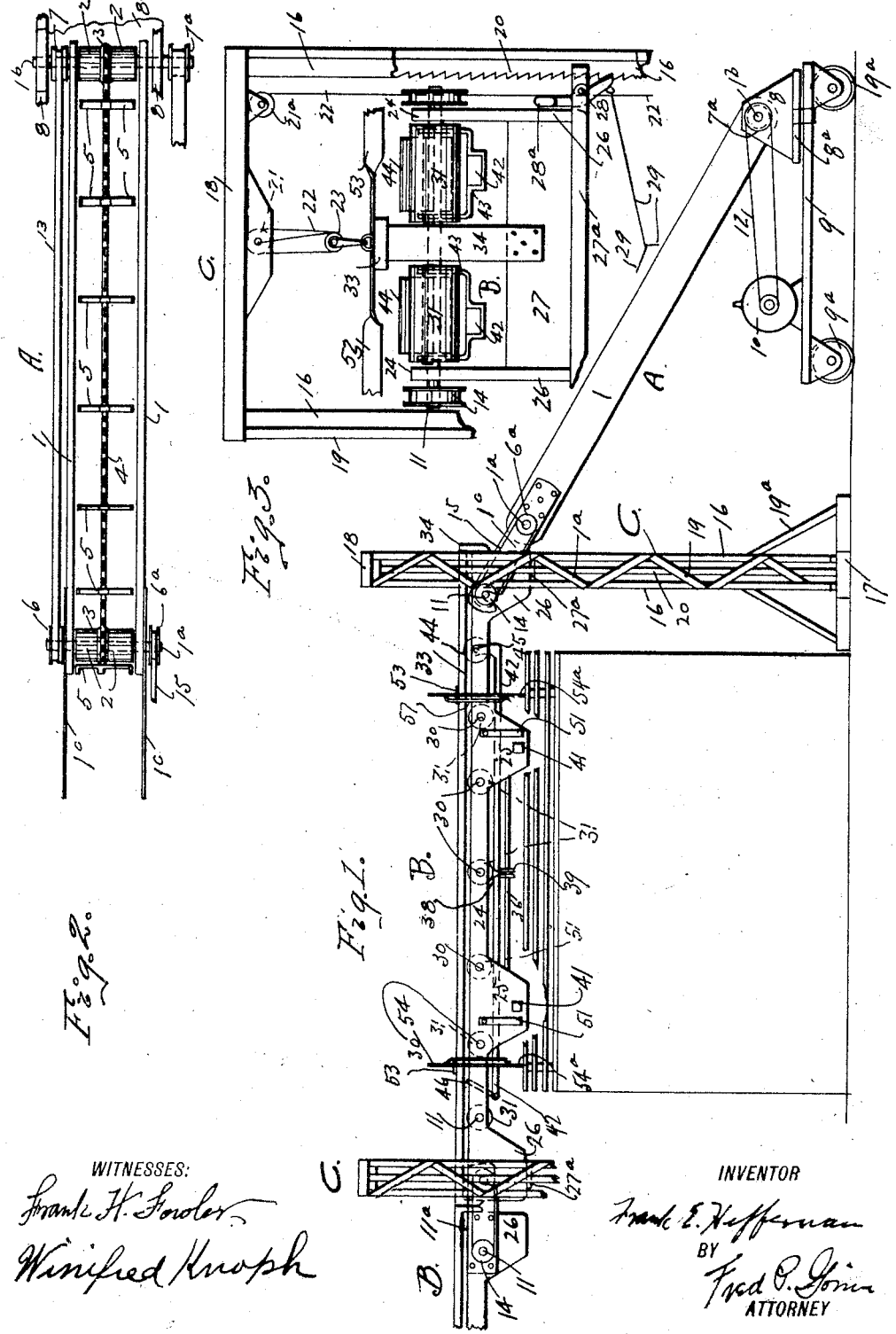

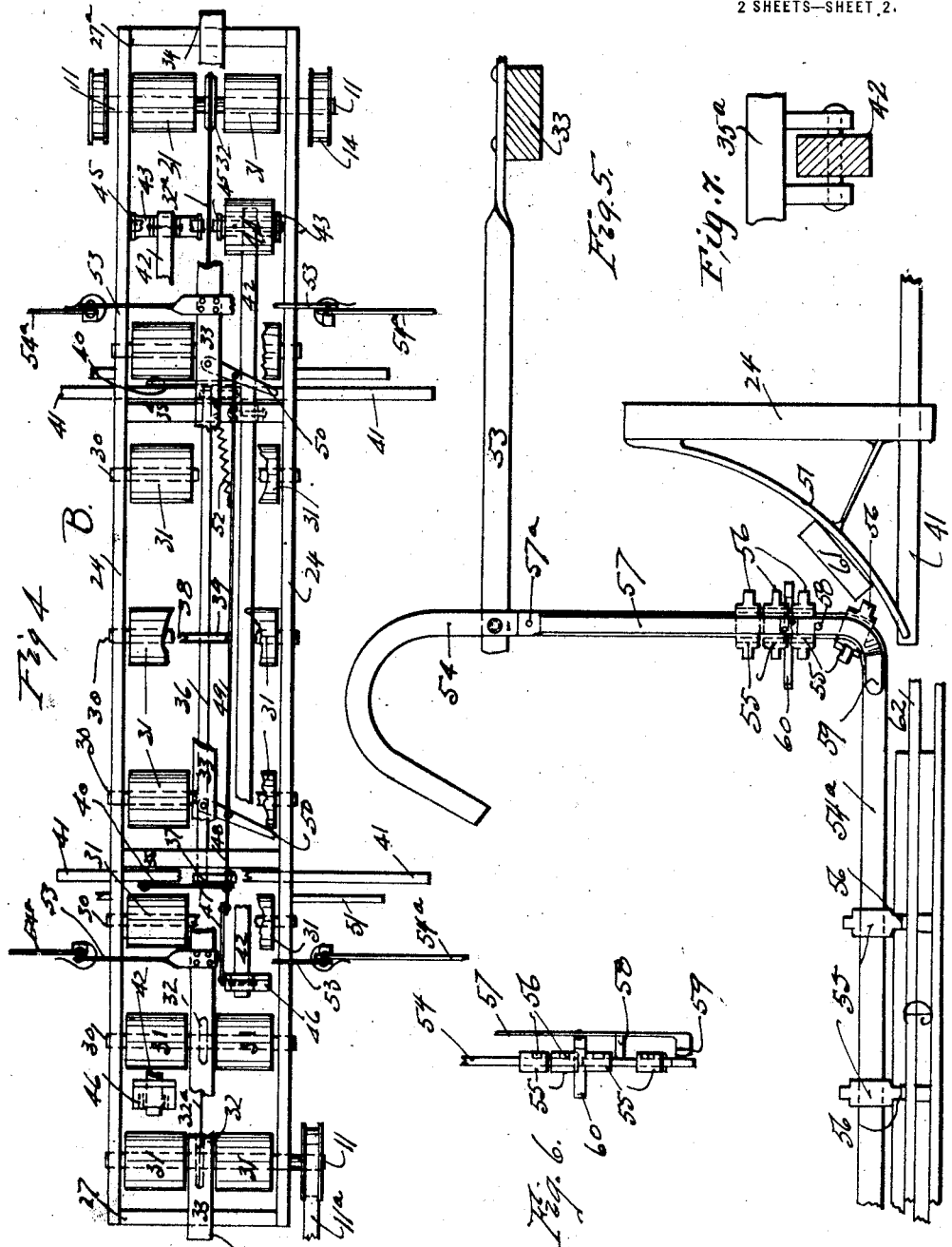

FRANK E. HEFFERNAN, OF FAIRFAX, WASHINGTON.

MATERIAL-PILING DEVICE.

1,202,838.

Specification of Letters Patent.

Patented Oct. 31, 1916.

Application filed January 11, 1915. Serial No. 1,551.

*To all whom it may concern:*

Be it known that I, FRANK E. HEFFERNAN, a citizen of the United States, and a resident of Fairfax, in the county of Pierce and State of Washington, have invented certain new and useful Improvements in Material-Piling Devices, of which the following is a full, true, and exact specification.

My invention relates to material piling devices and has for its principal objects; to provide adjustable, conveying, elevating, sorting, distributing and placing means for piling lumber or similar material which is manufactured in various lengths; to provide automatic means for spacing the various pieces of lumber, of the same length, evenly upon the pile and means for withdrawing said spacers so that they may be used again in the next tier of lumber.

My invention will be more fully explained in the following specification, illustrated in the accompanying drawings and pointed out in the appended claim.

In the drawings, Figure 1 is a side elevation of a portion of my device including an elevating conveyer, and one distributing unit. Fig. 2 is a plan view of the elevating conveyer. Fig. 3 is an enlarged end elevation of the distributing unit. Fig. 4 is an enlarged plan view of the distributing unit with parts broken away. Fig. 5 is an enlarged fragmentary view of the spacing means. Fig. 6 is a part front elevation of Fig. 5. Fig. 7 is a detail view.

In the drawings, letter A represents an elevating conveyer, B a conveying, distributing and piling unit of which there may be any convenient number joined end to end and supported by towers C.

In conveyer A, numeral 1 designates sides supported by shafts $1^a$ and $1^b$ on which are mounted rollers 2, with sprocket wheels 3 between. An endless chain belt 4 is driven by sprockets 3 and supports cross pieces 5. The shafts $1^a$ and $1^b$ have pulleys 6, $6^a$ and 7 and $7^a$ respectively, attached to them as shown in Figs. 1 and 2. Shaft $1^b$ is mounted in bearing blocks 8 which are in turn mounted upon a turn table $8^a$ carried upon a truck 9 upon which is mounted a dynamo 10 or other source of power. The truck is provided with wheels $9^a$ which are adaptable to run on either rails or the ground. It is thus seen that the conveyer A may be moved about on its truck when not in operation. Sides 1 of the conveyer are provided with rigid extension hooks $1^c$ which are adaptable to hook over shaft 11 of the distributing unit B. Belt 12 drives the shaft $1^b$ from motor 10 and belt 13 drives pulley 6 from pulley 7 while a pulley 14 on distributer B is driven from pulley $6^a$ by a belt or chain 15. Towers C are composed of uprights 16, bases 17, head blocks 18 and brace members 19 and $19^a$. To brace members 19 are secured vertical racks 20. Head blocks 18 support sheave wheels 21 and $21^a$ which in turn support a line 22 passing over similar wheels 23 on distributing conveyer B and down the side of tower C to a fastening cleat (not shown).

The function of the sheaves and line is to provide means for raising and lowering conveyer B each end of which is supported between the legs of tower C as shown in Fig. 3. Conveyer distributer B is composed of side members 24 having depressed portions 25 and 26, the latter being tied together by struts 27 and $27^a$. Pivotally secured to struts $27^a$ at either end, of conveyer B, are pawls 28 one at either end of strut $27^a$ and adapted to engage the teeth of racks 20. Counterweights $28^a$ assist in normally holding the pawls in engagement, while a trip line 29 serves to release the pawls when a pull is applied to it, by an operator on the ground, as is necessary when it is desired to lower conveyer B. Shafts 30 and 11 have rollers 31 and sprockets 32 attached thereto, the sprockets being located between the rollers as shown in Fig. 4. A chain $32^a$ runs from the sprockets on shafts 11 over all the other sprockets 32, thereby keeping all of the rollers in uniform motion. A strip 33 runs above sprockets 32 and is supported at its ends by uprights 34. Strut members 35 and $35^a$ are secured to side frames 24 and serve to support a shaft 36 on each end of which is secured a crank arm 37. Shaft 36 is driven by a chain 38 running over a sprocket 39 on said shaft and a similar sprocket on the shaft 30 which is located directly above sprocket 39. Secured to pins on cranks 37 are ends of connecting rods 40, the other ends being loosely secured to reciprocating push bars 41 which operate back and forth in guides in frames 24 and whose function is to push the lumber out upon the pile as will be explained later.

Beams 42 are pivotally secured to struts $35^a$ and are provided with yokes 43 at their forward ends. In said yokes are revolubly mounted rollers 44 upon shafts 45. Hinged to the other ends of beams 42 are upstanding bumpers 46, whose upper ends normally are below the level of the tops of rollers 31. Normally, rollers 44 stand somewhat higher than rollers 31 as shown in Fig. 3. Rollers 44 and their respective bumpers 46 are located at a predetermined distance apart so that when a board or timber of the proper length is moving along on the rollers of the distributing and conveying unit B, the weight of the said board holds roller 44 in a depressed position and thereby raises the bumper 46 by means of the tilting of beam 42 about its support. When the forward end of the board strikes the bumper 46, the said bumper is pushed forward a sufficient distance to actuate attached rods 47, 48 and 49 which operate levers 50 which are pivoted to strip 33 as shown in Fig. 4. This operation or pulling forward, from under strip 33 of the free ends of levers 50 shoves the board off from the rollers upon the guides 51. A spring 52 returns levers 50 to normal position. If the board had been shorter than the distance between roller 44 and its respective bumper 46, the rear end of said board would have rolled off of rollers 44 before the forward end struck bumper 46, thereby allowing time for said bumper to drop down to normal position and thus raise roller 44. It will be understood that the commercial lengths of boards vary by approximately two feet. The roller 44, bumper 46, levers 50 and connecting rods are shown in position as discharging a board from the roller on the lower side of unit B as shown in Fig. 4. The upper side of unit B is similarly equipped with levers 50, rods 47, 48, 49 and spring 52 which are not shown. It will be noted that the bumper 46 on the upper side of unit B is located farther forward than that on the lower side, a distance of approximately two feet. Therefore, the said upper side is equipped to select a greater length of lumber than the lower side.

The various units B are arranged so that the two larger lengths of boards are discharged from the first unit while the shorter ones pass on to subsequent units which continue to select the longest boards available and to pass the shorter ones on to the next unit; that is if the longest boards were 24 feet long the next would be 22 feet and so on, decreasing by two feet at a time and the 24 feet, 20 and 16 feet boards would be sent forward to the upper side of units A and B, the longest lengths being selected by the first unit B and the 20 ft. lengths by the second unit B. The 22 ft. 18 ft. and 14 ft. lengths would be sent forward to the lower side of said units and be selected in the same order, enough units B being provided to select and discharge therefrom all lengths of boards being handled and stacked. Cross bars 53 are secured to the top of strip 33, one at either end of the board to be discharged. On each end of a bar 53 is pivoted a spacer bar 54 which has an outstanding leg 54ª which is adapted to lie horizontally across the top of a pile of lumber D. Spacers 55 having space lugs 56 are adapted to slide along bars 54. A feeding apparatus is attached to the spacer bar 54 which allows but one spacer to be fed in between each pair of boards.

The feed apparatus consists of a spring member 57 which is secured at 57ª to bar 54 and has a stop pin at 58 and a crook 59 at its lower end and a check bar 60, one end of which is secured to spring member 57 above pin 58, a distance greater than the length of one spacer, the other end being bent around until it normally just clears the back of the spacers 55.

The operation of the feed apparatus is as follows: The bar 54 is so located that when a board 61 as in Fig. 5 slides down guides 57 it will strike a spacer 55 which is held in the bend of bar 54 by the spring end 59 of spring member 57. As the board strikes the spacer it carries it along bar 54ª springing the spring member outwardly which moves pin 58 out so as to allow another spacer to drop forward. At the same time the end of check bar 60 is drawn inward and prevents the other spacers from dropping down bar 54. When the board 61 has moved out beyond the end of push bar 41 and has dropped into piling strip 62, the push bar 41 is operated as previously described, thereby pushing the boards out upon the pile D as is shown in Fig. 5. When the tier of boards on the pile have been shoved out until they cover the width of said pile, an operator raises the spacer bar 54 about its pivot point and shoves the spacers 55 back along the bar above the spring member 57.

The general operation of my invention is as follows: When the units A and B are set in motion by motor 10, the said units being driven one from another by connecting belts 11ª and the units B being at the proper elevation in relation to the piles of lumber D, timber is placed upon the conveyer unit A. The proper lengths of lumber are placed upon the proper side of said conveyer A, which raises and deposits the lumber upon the first unit B which sorts out the longer lengths as previously described, the shorter lengths passing on to the subsequent units B upon which they are further sorted and piled. The unit B may be raised or lowered to suit the heights of piles by means of the lines 29 and 22 which operate pawls 28 and the hoisting tackle as previously described. The line 22 may be either pulled by hand or by motor 10. the various units A, B and C may be used as shown in any desirable multiples and may be easily moved from place to place as desired.

While I have shown a particular form of embodiment of my invention, I am aware that many minor changes therein will readily suggest themselves to others skilled in the art, without departing from the spirit and scope of the invention, and I therefore desire to avoid being limited to the exact form shown and described, except as defined in the appended claim.

Having described my invention, what I claim as new and desire to protect by Letters Patent, is—

In a device of the class described, the combination of sorting and distributing means, said means including a pivotally mounted beam, a bumper pivotally mounted on one end of said beam, an idler roller revolubly secured to the other end of said beam, the said roller normally projecting above the level of the conveying surface of the conveyer and the said bumper wholly below said surface, whereby when a piece of material which is being conveyed strikes the roller, the weight of the material depresses the roller and raises the bumper within the path of the said material and when the material is of a length greater than the distance between the roller and the bumper, the said material is arrested by said bumper; and pivoted levers operated by the energy of the moving piece of material striking the said bumper which eject the said material laterally from the conveyer.

FRANK E. HEFFERNAN.

Witnesses:
C. H. SMITH,
FRED W. BURGESON.